US012251845B2

(12) United States Patent
Grasmeijer et al.

(10) Patent No.: US 12,251,845 B2
(45) Date of Patent: Mar. 18, 2025

(54) HAIR-CUTTING UNIT FOR A SHAVING DEVICE

(71) Applicant: KONINKLIJKE PHILIPS N.V., Eindhoven (NL)

(72) Inventors: Ingmar Grasmeijer, Leeuwarden (NL); Margarita Zwanette Van Raalte, Tuk (NL); Hemmo Nieman, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 772 days.

(21) Appl. No.: 17/441,107

(22) PCT Filed: Feb. 14, 2020

(86) PCT No.: PCT/EP2020/053995
§ 371 (c)(1),
(2) Date: Sep. 20, 2021

(87) PCT Pub. No.: WO2020/187508
PCT Pub. Date: Sep. 24, 2020

(65) Prior Publication Data
US 2022/0143849 A1 May 12, 2022

(30) Foreign Application Priority Data
Mar. 20, 2019 (EP) .................................... 19164001

(51) Int. Cl.
*B26B 19/14* (2006.01)

(52) U.S. Cl.
CPC ................................. *B26B 19/143* (2013.01)

(58) Field of Classification Search
CPC .............................. B26B 19/14; B26B 19/384
See application file for complete search history.

(56) References Cited

U.S. PATENT DOCUMENTS 2,533,979 A * 12/1950 Vivie .................... B26B 19/143
30/346.51
2,562,104 A 7/1951 Kobler
(Continued)

FOREIGN PATENT DOCUMENTS

CA 2536353 A1 * 8/2006 ........... B26B 19/141
CN 213562712 U 6/2021
(Continued)

OTHER PUBLICATIONS

International Search Report and Written Opinion, International Application No. PCT/EP2020/053995, Mailed on Apr. 6, 2020.

*Primary Examiner* — Hwei-Siu C Payer

(57) ABSTRACT

A hair-cutting unit with rotatable cutting elements for use in a shaving device has hair entry slits of which at least a side surface facing in a direction generally opposite to a direction of rotation of the cutting elements, has a relatively flat and oblique intermediate segment between an upper segment forming a curved transition to the outer surface of the annular wall and a lower segment which serves for catching hairs and urging these into an upright position for achieving a close shave. Within a relatively broad range of shaving pressures, the pleat of skin bulging into a hair-cutting slit contacts a portion or at most all of the intermediate segment. Because the intermediate segment is relatively flat, changes in the extent of skin penetration in response to changes in shaving pressure are significantly reduced.

17 Claims, 6 Drawing Sheets

(56) References Cited

U.S. PATENT DOCUMENTS

| | | | | | |
|---|---|---|---|---|---|
| 2,824,367 | A * | 2/1958 | McWilliams | B26B 19/14 30/34.2 |
| 2,877,548 | A * | 3/1959 | Starre | B26B 19/384 30/346.51 |
| 3,064,349 | A | 11/1962 | Bodo et al. | |
| 4,184,250 | A * | 1/1980 | Meijer | B26B 19/384 30/346.51 |
| 5,544,414 | A | 8/1996 | Dekker et al. | |
| 5,802,721 | A | 9/1998 | Brown | |
| 10,046,469 | B2 | 8/2018 | Godlieb | |
| 2017/0361478 | A1* | 12/2017 | Sakon | B26B 19/042 |
| 2022/0143849 | A1* | 5/2022 | Grasmeijer | B26B 19/143 |
| 2024/0173879 | A1* | 5/2024 | Varghese | B26B 19/145 |

FOREIGN PATENT DOCUMENTS

| | | | | |
|---|---|---|---|---|
| EP | 0428211 | A1 | 5/1991 | |
| EP | 3398733 | A1 * | 11/2018 | B26B 19/14 |
| EP | 3659759 | A1 * | 6/2020 | B26B 19/14 |
| JP | 3393289 | B2 | 7/2003 | |
| JP | 2011200494 | A | 10/2011 | |

* cited by examiner

HAIR-CUTTING UNIT FOR A SHAVING DEVICE

CROSS-REFERENCE TO PRIOR APPLICATIONS

This application is the U.S. National Phase application under 35 U.S.C. § 371 of International Application No. PCT/EP2020/053995, filed on 14 Feb. 2020, which claims the benefit of European Patent Application No. 19164001.0, filed on 20 Mar. 2019. These applications are hereby incorporated by reference herein.

FIELD OF THE INVENTION

The invention relates to a hair-cutting unit for use in a shaving device, the hair-cutting unit having an external cutting member and an internal cutting member which is rotatable relative to the external cutting member in a rotational direction about an axis of rotation, wherein:

- the internal cutting member comprises a plurality of cutting elements, each having a cutting edge with a respective main directional component of extension in a radial direction relative to the axis of rotation and located on a side of the cutting element leading in the direction of rotation;
- the external cutting member has an annular wall having an outer surface facing away from the internal cutting member and a plurality of hair-entry slits which are mutually separated by hair-guiding strip portions of the annular wall, each hair-entry slit and each hair-guiding strip portion being elongated and having a respective main directional component of longitudinal extension in a radial direction relative to the axis of rotation, and each hair-guiding strip portion having a counter-cutting edge for co-operation with the cutting edges of the internal cutting member during rotation of the internal cutting member in the rotational direction; and
- each hair-guiding strip portion has an inward surface facing the internal cutting member, an outward surface being part of said outer surface, a first side surface facing in the rotational direction, and a second side surface facing in a direction opposite to the rotational direction, wherein the inward surface and the second side surface mutually connect at the counter-cutting edge of the respective hair-guiding strip portion.

The invention further relates to a shaving unit for use in a shaving device, the shaving unit having a supporting member and at least two hair-cutting units as described above.

The invention further relates to a shaving device having a shaving unit as described above and a main body accommodating a motor and a drive system, wherein the shaving unit is coupled to the main body such that the internal cutting members of the hair-cutting units of the shaving unit are rotatable by means of the motor via the drive system.

BACKGROUND OF THE INVENTION

A hair-cutting unit, a shaving unit and a shaving device as described above are known from U.S. Pat. No. 10,046,469. During use of such a shaving device, the outer surface of the annular wall of the external cutting member is pressed against the skin by the user and moved over the skin surface that is being shaved. As a result, hairs growing from the skin are caught in the slits and up-righted by side walls of the slits and the skin bulges into the openings formed by the hair entry slits. More specifically, the skin bulges into the elongated hair-entry slits of the external cutting member in the form of a small, shallow, wave-shaped pleats. This allows the cutting edges of the internal cutting member to pass very closely along the skin, so that the up-righted hairs present on these skin pleats bulging into the hair-entry slits can be cut in positions very close to or at the skin surface by co-operation of the cutting edges of the internal cutting member and the counter-cutting edges of the external cutting member. In the known hair-cutting unit, the edge portions at which the first side surfaces and the outward surfaces of the hair-guiding strip portions mutually connect and the edge portions at which the second side surfaces and the outward surfaces of the hair-guiding strip portions mutually connect each have a rounding with a relatively large radius. Such a rounding prevents irritation of the skin by the edge portions when the shaving device is moved over the skin.

A disadvantage of such known hair-cutting units is, that the extent to which the skin bulges into the hair-entry slits varies to a large extent, mainly in accordance with the pressure with which the user presses the external cutting member against the skin. As a result, the closeness of the hair-cutting process varies significantly with the value of this pressure. When the pressure is too high, skin portions bulging into the hair-entry slits may even contact the cutting edges of the rotating internal cutting member, so that skin irritation or even skin damage may occur. When the pressure is too low, closeness of shaving suffers, so that the shaving result is much less smooth than when pressure in an optimal range is exerted.

SUMMARY OF THE INVENTION

It is an object of the present invention to provide a hair-cutting unit, a shaving unit and a shaving device wherein the closeness of the hair-cutting process and the degree of skin irritation are less sensitive to the pressure with which the user presses the hair-cutting unit against the skin, so that a smooth, close shaving result without skin irritation can be achieved over a wider range of pressures at which the cutting unit is pressed against the skin, while still providing for effective up-righting of hairs by side walls of the slits for overall closeness of shaving.

This object is achieved by providing a hair-cutting unit as described herein.

It has been found that, in prior art shaving units, the extent to which the skin bulges into the hair-entry slits is affected by movement of the hair-cutting unit over the skin. The variation of skin penetration in response to changes in exerted shaving pressure is particularly affected by movement over the skin when the hair-entry slits move over the skin in a direction transverse to the direction of longitudinal extension of the respective hair-entry slits.

However, for overall shaving performance and comfort, a constant extent of skin penetration is particularly relevant during movement of the cutting head over the skin, as this is what the user has to do to shave hairs from a given skin surface area. Based on these insights, the invention is aimed in particular at achieving a more constant skin penetration, in particular while the cutting head is moved over the skin while shaving pressure is varied to some extent, as is usual during normal use of an electric shaver.

Without being bound to theory, the effect of the invention appears to be a reduction of variations in the direction of frictional and normal forces exerted on the skin by the side surface of the hair-guiding strip portion, facing in generally the direction of movement of the hair-cutting unit over the skin, resulting from variations of the extent to which the skin bulges into the hair-entry slit. The side surface of the hair-guiding strip portion facing in generally the direction of movement of the hair-cutting unit over the skin exerts a friction force onto a pleat of skin bulging into the hair-entry slit, that is directed along the contacted surface of that side surface. In the prior art shaving unit, that contacted surface is curved from the outer surface towards a generally axial direction to the lower segment. The more pressure is exerted, the more the skin bulges into the hair-entry slit. As a result, as pressure is increased, the contacted surface grows in a direction down into the hair-entry slit, where it rapidly curves steeper down towards the inward surface. Accordingly, as pressure is increased, the direction in which friction forces are exerted onto the skin turns more axially downward into the slit. Exerted normal forces rotate along accordingly. This causes the pleat of skin to be urged more into the hair-entry slit than it would be just by the increased counter pressure.

The increased variation of skin penetration is particularly relevant on the side of the second side surface, which faces in a direction opposite to the rotational sense of movement of the cutting elements. Skin irritation tends to be relatively marked when the cutting elements touch the skin close to the side surface facing in a direction opposite to the rotational sense of movement of the cutting elements.

In the hair-cutting unit according to the invention, such effects are at least significantly mitigated, because at least the second side surface, i.e. the side surface facing in a direction generally opposite to the direction of rotation of the cutting elements, has a relatively flat and oblique intermediate segment between the upper segment, forming a curved transition to the outer surface of the annular wall, and the lower segment, which serves for catching hairs, and urging these into an upright position for achieving a close shave. Within a relatively broad range of shaving pressures, the pleat of skin bulging into a hair-cutting slit contacts a portion of or at most the entire intermediate segment. Because the intermediate segment is relatively flat (seen in cross-sectional view it may partially or entirely be slightly concave or slightly convex as well), changes of the surface portion of the intermediate segment that is contacted by the pleat of skin bulging into the hair-cutting slit cause no or only relatively small changes in the direction in which forces are exerted on the skin while the hair-cutting unit is moved over the skin generally in a direction in which that side surface is facing. Thus, the contribution to changes in the extent of skin penetration in response to changes in shaving pressure by the change of the direction in which forces are exerted onto the skin by the side surface facing in generally the direction of movement over the skin is avoided or at least significantly reduced.

The invention can also be embodied in a shaving unit and in a shaving device as described herein.

If only the side surface of a hair-entry slit facing in a direction generally opposite to the direction of rotation of the cutting elements is provided with an oblique, relatively flat intermediate segment according to the invention, the opposite side surface can be shaped to optimize catching hairs and bring hairs in an upright position, which is advantageous for a quick and close shave. However, for a particularly effective reduction of the variation in depth of skin penetration into the hair-entry slit in response to variation of shaving pressure while the shaving unit is moved over the skin, it is preferred that also the side surfaces facing generally in the direction of rotation of the cutting elements are provided with an oblique, relatively flat intermediate segment according to the invention.

For ease of manufacturing and symmetry of changes in the extent of skin penetration in opposite sectors of each shaving head, as the shaving head is moved over the skin in various directions, it is preferred that, in cross-section, taken perpendicularly to the radial direction:

- the locations and dimensions in axial direction of the intermediate segments are the same for opposite side surfaces of each slit ($y\mathbf{1}=y\mathbf{3}$ and/or $y\mathbf{2}=y\mathbf{4}$),
- the angles of inclination relative to the axial direction are the same for opposite side surfaces of each slit ($\alpha\mathbf{1}AV=\alpha\mathbf{2}AV$), and/or
- the flatness and/or curvature, if any, of the intermediate segments is the same for opposite side surfaces of each slit ($\alpha\mathbf{1}\delta=\alpha\mathbf{2}\delta$).

For a particularly effective reduction of the variation in depth of skin penetration into the hair in response to variation of shaving pressure while the shaving unit is moved over the skin, it is preferred that, in cross-section, taken perpendicularly to the radial direction and for one or both opposite side surfaces of all or some of the slits:

- the intermediate surface extends over a height of at least 0.3 times the depth of the hair-entry slit ($y\mathbf{4}-y\mathbf{3}\geq 0.3*D$ and preferably $y\mathbf{2}-y\mathbf{1}\geq 0.3*D$), and/or
- the intermediate segments are completely flat ($\alpha\mathbf{2}\delta=0$ and $\alpha\mathbf{2}=\alpha\mathbf{2}AV$ in each position on the intermediate segment of the second side surface and preferably $\alpha\mathbf{1}\delta=0$ and $\alpha\mathbf{1}=\alpha\mathbf{1}AV$ in each position on the intermediate segment of the first side surface).

If, in cross-section, taken perpendicularly to the radial direction, within the aforementioned range of radial positions:

- in each position on the lower segment of the second side surface for which $y\leq 0.8*D$, $70°\leq\alpha\mathbf{2}\leq 110'$; and/or
- if also the first side surface has an intermediate segment according to the invention, in each position on the lower segment of the first side surface for which $y\leq 0.8*D$, $70°\leq\alpha\mathbf{1}\leq 110°$, also an upper portion of at least one of the lower segments is shaped for catching hairs and urging hairs into an upright position, prior to cutting, particularly effectively. Preferably, the angular range of $70°\leq\alpha\mathbf{2}\leq 110°$ applies to each position on the lower segment of the respective side surface for which $y\leq 0.9*D$.

For particularly effective hair catching, it is also advantageous if upper boundaries of the lower segments are located at an axial distance of at least 0.5 times, more preferably at least 0.6 times and yet more preferably at least 0.7 times, the depth of the hair-entry slit from the inward surface of annular wall ($y\mathbf{2}\leq 0.5*D$ and/or $y\mathbf{4}\leq 0.5*D$, $y\mathbf{2}\leq 0.4*D$ and/or $y\mathbf{4}\leq 0.4*D$, or $y\mathbf{2}\leq 0.3*D$ and/or $y\mathbf{4}\leq 0.3*D$).

Hairs that are not yet cut sometimes tend to be engaged by the transition from the lower segment of the first side surface to an adjacent portion of the inward surface of the annular wall. This problem can be mitigated by providing that the first side surface has a rounded shape connecting the lower segment of the first side surface to an adjacent portion of the inward surface of the annular wall.

If a width W of each hair-entry slit has a value in the range $0.24\text{ mm}\leq W\leq 0.36\text{ mm}$, and the maximum depth D of each hair-entry slit has a value in the range $0.19*W\leq D\leq 0.42*W$, a particularly quick and close shave can be achieved without causing uncomfortable skin irritation.

The range of radial positions to which features as described applies may extend from an internal radial end of the respective cutting edge or of the respective hair-entry slit until an external radial end of the respective cutting edge or of the respective hair-entry slit. If boundaries of the rotary cutting path of combined trajectories along which the cutting edges pass along the inner surface of the annular wall are radially beyond (inside or outside) ends of the hair-entry slits, the features as described preferably apply over the entire length of the hair-entry slit. Otherwise, sections of the hair-entry slits located radially beyond the radial boundaries of the cutting path may have a different shape, such as mainly optimized for smooth movement over the skin and rounded for avoiding snagging engagement with hairs.

Further features, effects and details of the invention appear from the detailed description and the drawings.

DETAILED DESCRIPTION OF THE EMBODIMENTS

Figure 1:
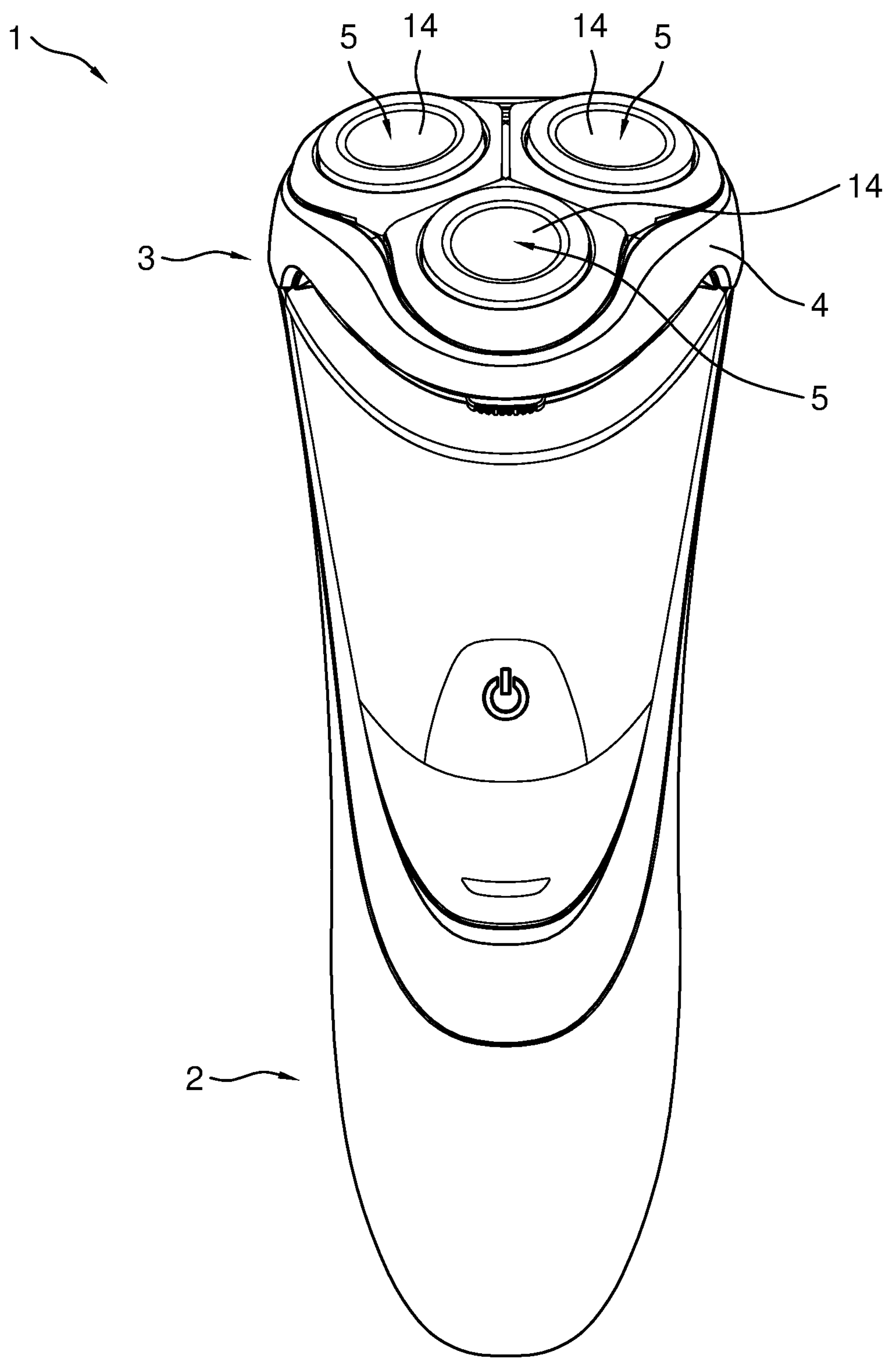
FIG. 1 shows, in a perspective view, a first example of a shaving device according to the invention.
Figure 2:
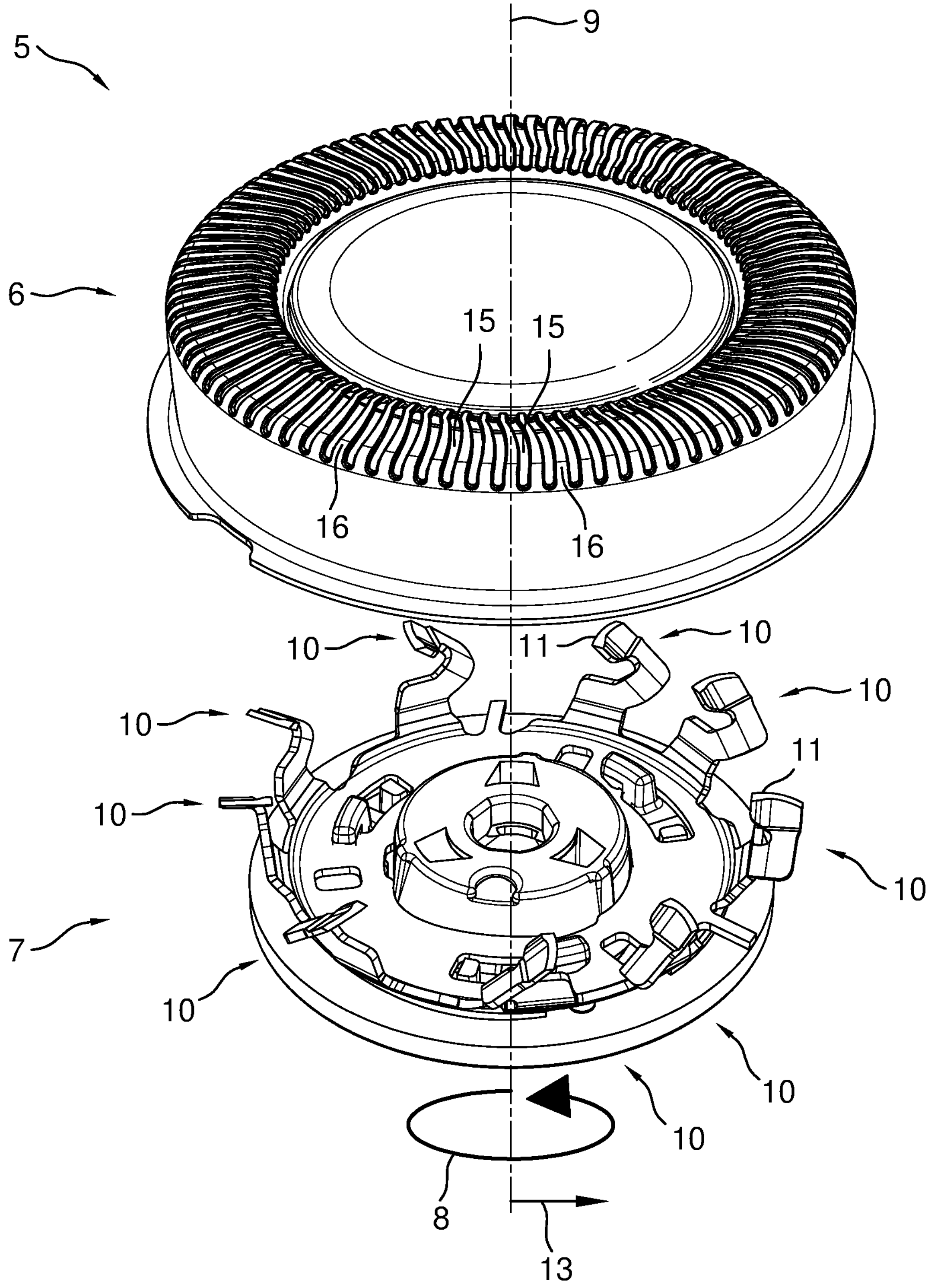
FIG. 2 is a perspective view of an example of one of three hair-cutting units according to the invention of the shaving device of FIG. 1, wherein an internal cutting member and an external cutting member of the hair-cutting unit are shown as an exploded view.

As can be seen in FIGS. 1 and 2 a shaving device 1 according to the shown example has a main body 2, a shaving unit 3 coupled to the main body via a supporting member 4. The shaving unit 3 has three hair-cutting units 5. Each of the hair-cutting units 5 has an external cutting member 6 with an annular wall 12 and an internal cutting member 7 rotationally suspended and drivable for rotation in a direction (sense) of rotation 8 about an axis 9, such that cutting elements 10 of the internal cutting member 7 slide along an inward facing surface 18 of the annular wall 12. The annular wall is provided with slits 15 alternating in circumferential sense with strip portions 16 of the annular wall 12. The cutting elements 10 are (preferably evenly) distributed in circumferential sense around the axis of rotation 9 and each have a cutting edge 11 arranged for co-operation with counter cutting edges 17 that are located where second side walls 21 facing in a direction opposite to the sense of rotation 8 meet the inward surface 18 of the annular wall 12.

Figure 3:
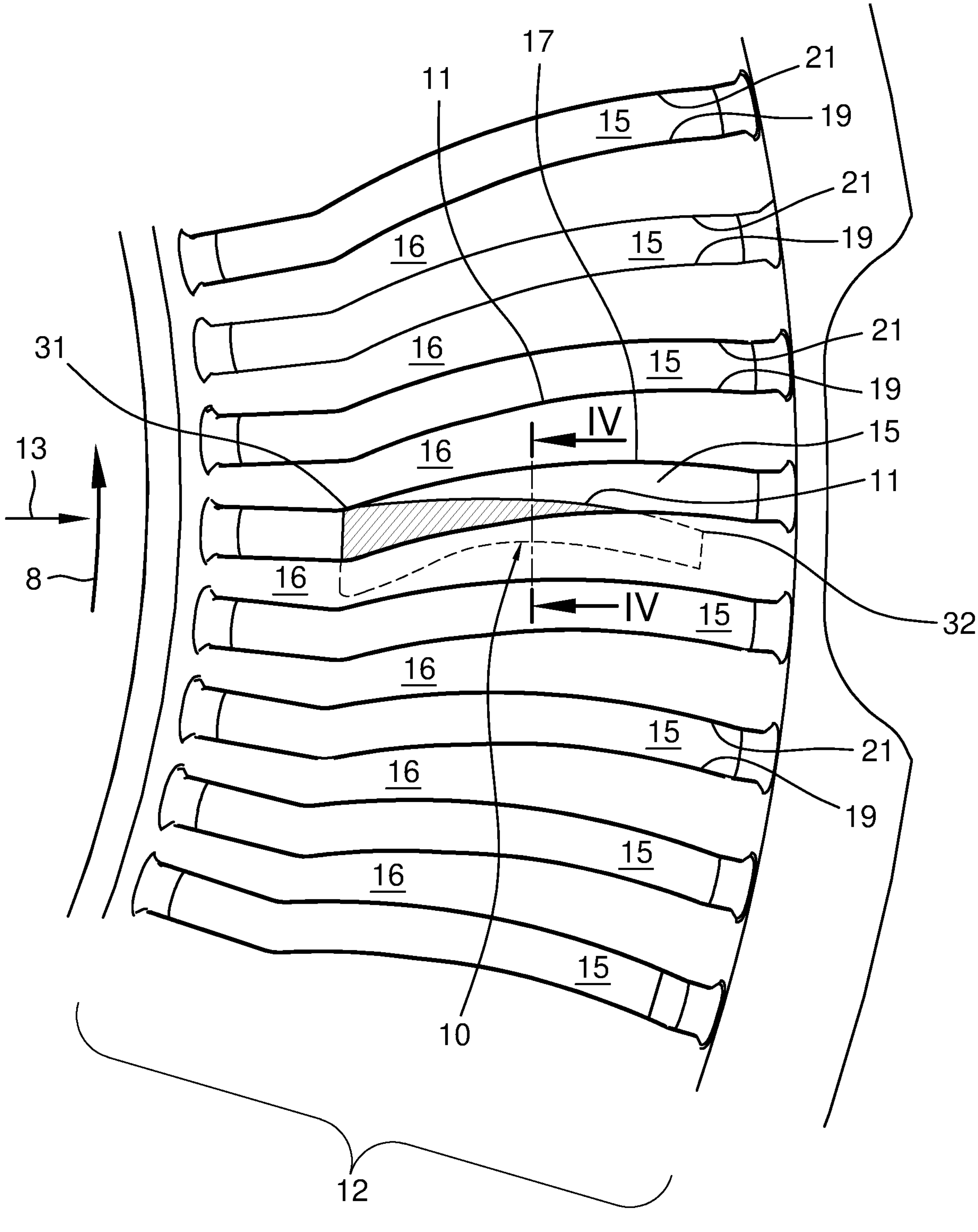
FIG. 3 is a more detailed top plan view in a direction parallel to an axis of rotation of the hair-cutting unit of a portion of the hair-cutting unit of FIG. 2.

The cutting edges 11 each have a main directional component of extension in a radial direction 13 relative to the axis of rotation 9 and are each located on a side of the associated cutting element 10 that is leading in the direction of rotation 8. FIG. 3 shows one of these cutting elements 10 with its cutting edge 11 having, in a radial direction 13, an inward cutting edge end 31 and an outward cutting edge end 32.

The annular wall 12 further has an outer surface 14 facing away from the internal cutting member 7. Each hair-entry slit 15 and each hair-guiding strip portion 16 is elongated and has a respective main directional component of longitudinal extension in a radial direction 13 relative to the axis of rotation 9. In general, the length of the slits is preferably at least four times, and more preferably at least eight times the width of the slits. Portions of the inward facing surface 18 of the annular wall 12 are located on each hair-guiding strip portion 16 and face the internal cutting member 7. Each slit 15 has a first side surface 19 facing generally in the rotational direction 8 and a second side surface 21 facing generally in a direction opposite to the rotational direction 8.

Figure 4:
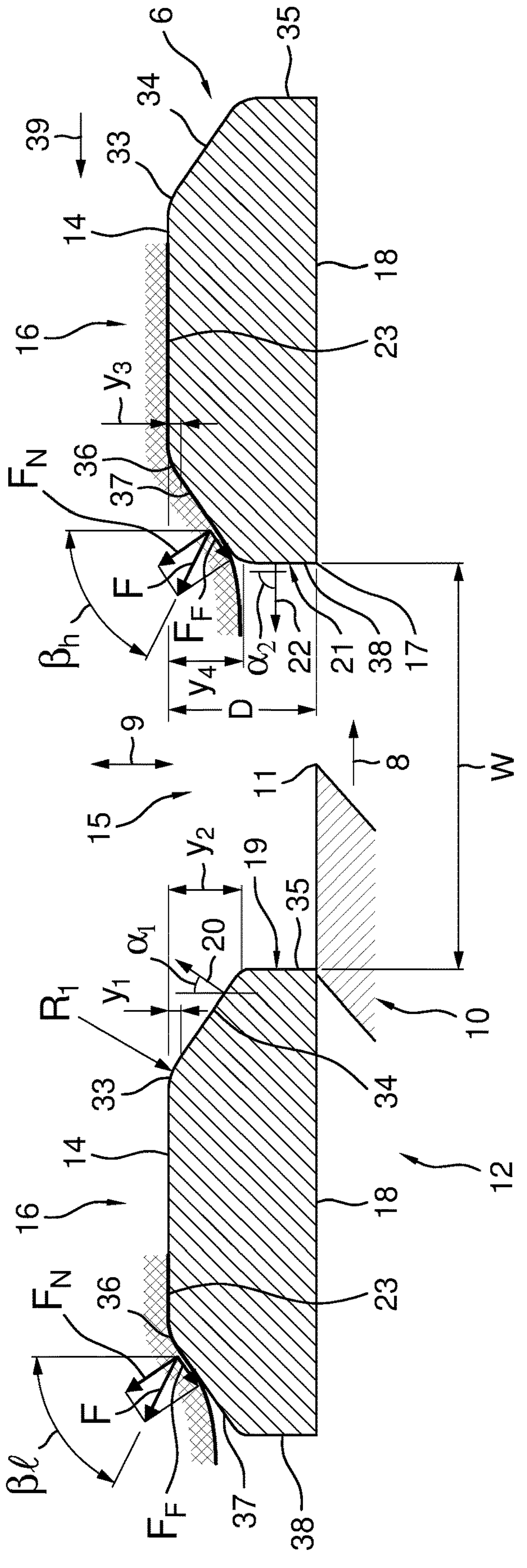
FIG. 4 is a schematic cross-sectional view along line IV-IV in FIG. 3.

As best seen in FIG. 4, in a cross-section taken perpendicularly to the radial direction 13 at least within a range of radial positions relative to the axis of rotation 9 a maximum depth D of a respective hair-entry slit 15 is defined as a length of a maximum axial extension of a hair-guiding strip portion 16 adjacent to the respective hair-entry slit 15 in an axial direction parallel to the axis of rotation 9. Furthermore, a depth y is defined as a depth within the respective hair-entry slit 15 as measured from a level defined by the outer surface 14 and along the axial direction 9, wherein $0 \le y \le D$. First normal vectors 20 at a respective first side surface '19 and second normal vectors 22 at a respective second side surface 21 are each defined in a direction facing away from the corresponding hair-guiding strip portion 16.

For normal vectors 20 projecting from different positions along the first side surface 19 the following applies: $\alpha$1(y) is a value of a first angle $\alpha$1 in a position on the first side surface 19 at the depth y, while if the first normal vector 20 has a non-zero component in the axial direction 9 facing away from the internal cutting member 7, a first angle $\alpha$1 between the first normal vector 20 and the axial direction 9 is defined in the acute angular range $0° < \alpha 1 < 90°$ and if the first normal vector 20 has no component in the axial direction 9 or a non-zero component in the axial direction 9 facing towards the internal cutting member 7, the first angle $\alpha$1 is defined in the obtuse angular range $90° \le \alpha 1 < 180°$.

For normal vectors 22 projecting from different positions along the second side surface 21 the following applies: $\alpha$2(y) is a value of a second angle $\alpha$2 in a position on the second side surface 21 at the depth y, while if the second normal vector 22 has a non-zero component in the axial direction 9 facing away from the internal cutting member 7, a second angle $\alpha$2 between the second normal vector 22 and the axial direction 9 is defined in the acute angular range $0° < \alpha 2 < 90°$, and if the second normal vector 22 has no component in the axial direction 9 or a non-zero component in the axial direction 9 facing towards the internal cutting member 7, the second angle $\alpha$2 is defined in the obtuse angular range $90° \le \alpha 2 \le 180°$.

The first side surface 19 has an upper segment 33 extending from the outer surface 14 until a depth y1 and a lower segment 35 extending from a depth y2 in a direction away from the upper segment 33. The depth y1 where a lower end of the upper segment 33 is located is smaller than or equal to 0.2*D, so that the upper segment 33 occupies only a small portion of the depth D. y2 is smaller than or equal to 0.6*D, so that the depth of the lower segment 35 is larger than 0.4*D.

The second side surface 21 has an upper segment 36 extending from the outer surface 14 until a depth y3 and a lower segment 38 extending from a depth y4 in a direction away from the upper segment 36. y3 is smaller than or equal to 0.2*D, so that the upper segment 36 extends over only a small portion of the depth D. The depth y4 where a lower end of the upper segment 33 is located is smaller than or equal to 0.6*D, so that the depth of the segment 38 is larger than 0.4*D. The second side surface 21 moreover has an intermediate segment 37 extending from the depth y3 until a depth y4>y3. Furthermore, y4−y3≥0.2*D, so that the intermediate segment extends over at least one fifth of the depth D of the slit 15.

An average angle of normal vectors 22 of the intermediate segment 37 of the second side surface 21 (α2AV) is the average of the angle α2 at depth y3 and the angle α2 at depth y4. Furthermore the angles α2 at depth y3 and the angle α2 at depth y4 differ from the average angle by less than α2δ. The value of the average angle of the normal vectors 22 of the intermediate segment 37 of the second side surface 21 is in a range from 20° until 50° and at the depths y3 and y4, the deviation α2δ of that angle α2(y3) and α2(y4) from the average angle (α2AV) is in a range from 0° to 10°.

In each position on the upper segment 33 of the first side surface 19 α1≤α1 (y1) and dα1(y)/dy≥0 and in each position on the upper segment 36 of the second side surface 21 α2≤α2(y3) and dα(y)/dy≥0, so that the upper segments 33 and 36 are flat, convex or partially flat and partially convex. In the present example, the upper segments 33 and 36 are both convex, which is preferred to achieve a smooth transition from the outward surfaces 14 to each of the intermediate segments 34 and 37.

In each position on the lower segment 35 of the first side surface 19 70°≤α1≤110° and in each position on the lower segment 38 of the second side surface 21 70°≤α2≤110°, so that the lower segments 35 and 38 are oriented sufficiently transverse to the outward surface 14 to catch and upright hairs if the hair-cutting unit 5 is moved over a skin 23.

Without being bound to theory, the effect of the invention appears to be that variations in the direction of friction force $F_F$ exerted on the skin 23 by the side surface of the hair-guiding strip portion 16 facing in generally the direction of movement 39 of the hair-cutting unit 5 over the skin 23 depending on the extent to which the skin 23 bulges into the hair-cutting slit 15 are at least significantly reduced. In FIG. 4, this is illustrated by friction forces $F_F$ and normal forces $F_N$ exerted on two portions of skin 23. The portion of skin 23 shown on the right bulges further into the hair-entry slit 15 than the portion of skin 23 shown on the left. Such a difference is typically caused by a difference in pressure with which the hair-cutting unit 5 is pressed against the skin 23, but may also be caused or influenced by differences in skin tension and/or local skin flexibility.

As can be seen in FIG. 4, the directions in which the friction forces $F_F$, the normal forces $F_N$ and the total forces F are oriented are the same regardless whether the skin 23 bulges into the hair-entry slit 15 far, as in the example shown at the right, or bulges into the hair-entry slit 15 to a smaller extent, as in the example shown at the left. More in particular, the angle $\beta_h$ between the direction of the total force F at high shaving pressure and the axial direction 9 is essentially identical to the angle $\beta_l$ between the direction of the total force F at low shaving pressure and the axial direction 9. Because the intermediate segment 37 is flat, the direction of frictional forces and normal forces does not change when the skin bulges further into the hair-entry slit 15 and also contacts lower portions of intermediate segment 37. Accordingly, there is no change in direction of the forces exerted onto the skin 23 near the pleat that bulges onto the hair-entry-slit 15 and accordingly, the extent to which the pleat of skin is pushed into the hair-cutting slit is not increased by a change of direction of forces exerted thereon near the pleat that bulges onto the hair-entry-slit 15.

The effect of an increased variation of skin penetration in accordance with variation of shaving pressure, is particularly relevant on the side of the second side surface 21, which faces in the rotational sense of movement 8 of the cutting elements 10. In particular when the cutting elements 10 touch the skin 23 close to the side surface 21 facing in a direction opposite to the rotational sense of movement 8 of the cutting elements 10, skin irritation is often caused.

In the hair-cutting unit according to the present example, such effects are at least significantly mitigated, because the second side surface 21 has a flat and oblique intermediate segment 37 between the upper segment 36 forming a curved transition to the outer surface 14 of the annular wall 12 and the lower segment 38 which serves for catching hairs and urging these into an upright position for achieving a close shave.

For a particularly effective reduction of the variation in depth of skin penetration into the hair-entry slit 15 in response to variation of shaving pressure while the shaving unit is moved over the skin in a direction generally opposite to the direction 39 shown in FIG. 4, it is preferred that, as in the example shown in FIG. 4, also the side surface 19 facing generally in the direction of rotation 8 of the cutting elements 10 are provided with an oblique, relatively flat intermediate segment 34 with a geometry as described for the intermediate segment 37 of the side surface 21 facing in generally a direction opposite to the direction of rotation of the cutting elements 10.

Figure 5:
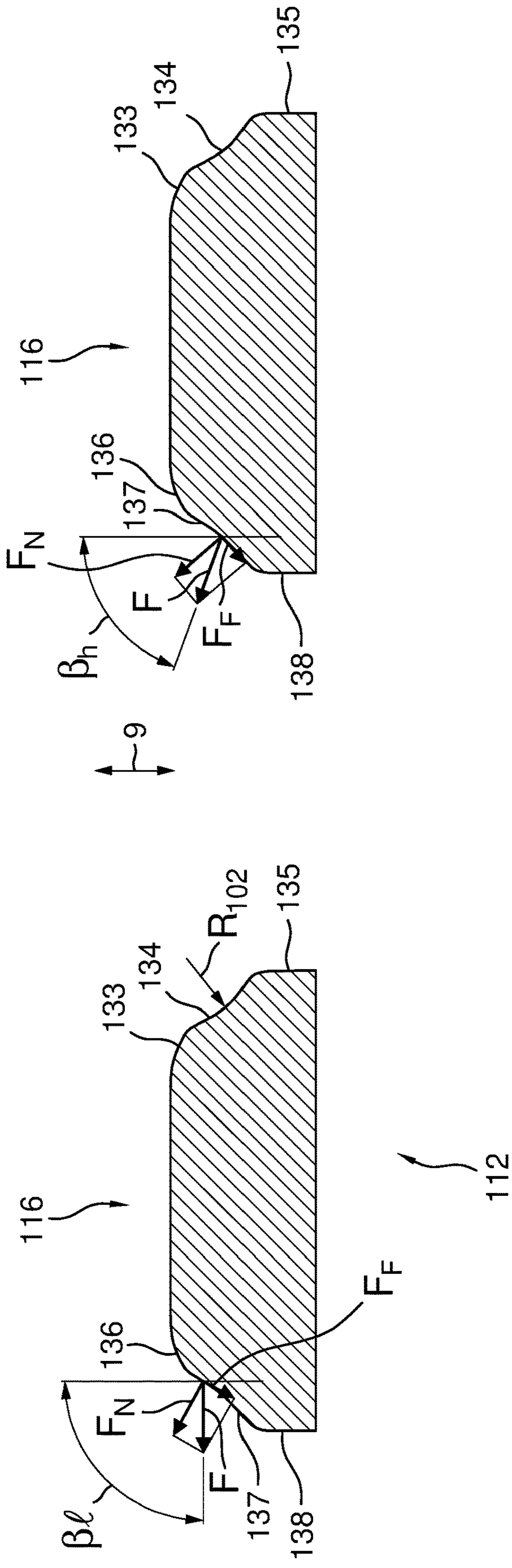
FIG. 5 is a view according to FIG. 4 of a second, different example of a hair-cutting unit according to the invention.

In FIG. 5, a portion of an annular wall 112 of an alternative example of a cutting head according to the invention is shown. In this example, the strip portions 116 of the annular wall 112 have side surfaces with upper segments 133, 136, intermediate segments 134, 137 and lower segments 135, 138. The intermediate segments 136 and 137 are each mainly shaped with a concave radius $R_{102}$. To the extent that the skin can follow the concave shape of the intermediate segments 136 and 136, the normal force FN and the frictional force FF are caused to become more horizontal as the skin bulges further into the hair-entry slit and is contacted by portions of the intermediate segment 134 or 137 closer to the lower end of the respective intermediate surface 134 or 137 of the side surface facing in generally the direction of movement over the skin. Thus, the angle βh between the direction of the total force F at high shaving pressure and the axial direction 9 is smaller than the angle βl between the direction of the total force F at low shaving pressure and the axial direction 9. Accordingly, a higher shaving pressure causes reaction forces exerted onto the skin near the pleat of skin bulging into the hair-entry opening 15 to be oriented more outwardly, which counteracts the tendency of the skin bulging further into the hair-entry opening as shaving pressure is increased.

Figure 6:
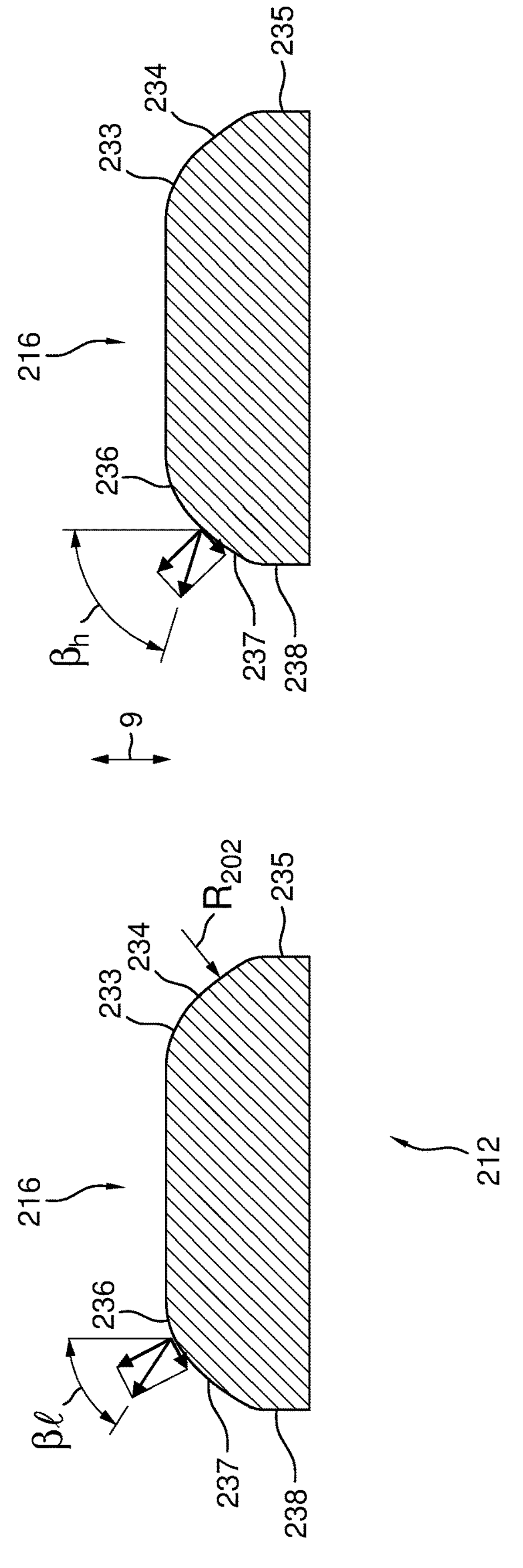
FIG. 6 is a view according to FIGS. 4 and 5 of a third, different example of a hair-cutting unit according to the invention.

In FIG. 6, a portion of an annular wall 212 of an alternative example of a cutting head according to the invention is shown. In this example, the strip portions 216 of the annular wall 212 have side surfaces with upper segments 233, 236, intermediate segments 234, 237 and lower segments 235, 238. The intermediate segments 236 and 237 are each mainly shaped with a convex radius $R_{202}$. In this example, the normal force $F_N$ and the frictional force $F_F$ are caused to rotate towards an axial direction 9 to the inside of the annular wall as the skin bulges further into the hair-entry slit and is contacted by portions of the intermediate segment 234 or 237 closer to the lower end of the respective intermediate surface 234 or 237 of the side surface facing in generally the direction of movement over the skin. Thus, the angle $\beta_h$ between the direction of the total force F at high shaving pressure and the axial direction 9 is larger than the angle $\beta_l$ between the direction of the total force F at low shaving pressure and the axial direction 9. Accordingly, a higher shaving pressure causes reaction forces exerted onto the skin near the pleat of skin bulging into the hair-entry opening 15 to be oriented more inwardly, but less so than if the side surface has no oblique intermediate segment between the upper segment and the lower segment with a substantially larger radius of curvature $R_{202}$ than the radius of curvature of the upper segment. Thus, also in a cutting head according to this example the intermediate segments 234, 237 are relatively flat, so that changes in the surface portion of the intermediate segment that is contacted by the pleat of skin bulging into the hair-cutting slit only relatively small changes in the direction in which forces are exerted on the skin when the hair-cutting unit is moved over the skin generally in a direction in which the side surface is facing. Thus, a contribution to changes in the extent of skin penetration in response to changes in shaving pressure by a change of the direction in which forces are exerted onto the skin by the side surface facing in generally the direction of movement over the skin is significantly reduced.

If the angle $\alpha$ is constant or increases from the upper border of the intermediate segment to the lower border of the intermediate segment (i.e. $\alpha\mathbf{1}(y\mathbf{1})\leq\alpha\mathbf{1}(y\mathbf{2})$ or $\alpha\mathbf{2}(y\mathbf{3})\leq\alpha\mathbf{2}(y\mathbf{4})$, so the intermediate segment is convex and/or flat, it is preferred that in each position on the intermediate segment $d\alpha(y)/dy\geq0$ and, if the angle $\alpha$ is constant or decreases from the upper border of the intermediate segment to the lower border of the intermediate segment (i.e. $\alpha\mathbf{1}(y\mathbf{1})\geq\alpha\mathbf{1}(y\mathbf{2})$ or $\alpha\mathbf{2}(y\mathbf{3})\leq\alpha\mathbf{2}(y\mathbf{4})$, so the intermediate segment is concave and/or flat, it is preferred that in each position on the intermediate segment $d\alpha(y)/dy\leq0$. Thus, the intermediate segment is preferably either flat, concave, convex, partially convex and partially flat or partially concave and partially flat. The absence of transitions from a convex shape to a concave shape are advantageous for allowing smooth sliding of the skin over the intermediate surface.

While the invention has been described and illustrated in detail in the foregoing description and in the drawing figures, such description and illustration are to be considered exemplary and/or illustrative and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. For the purpose of clarity and a concise description, features are disclosed herein as part of the same or separate embodiments, however, it will be appreciated that the scope of the invention may include embodiments having combinations of all or some of the features disclosed. The mere fact that certain measures are recited in mutually different dependent claims does not indicate that a combination of these measures cannot be used to advantage. Any reference signs in the claims should not be construed as limiting the scope.

The reference signs used in the figures refer to examples of the above-mentioned parts and aspects of the invention, as well as to related parts and aspects, in the following manner:

1 shaving device
2 main body
3 shaving unit
4 supporting member
5 hair-cutting unit
6 external cutting member
7 internal cutting member
8 rotational direction
9 axis of rotation
10 cutting element
11 cutting edge
12 annular wall portion
13 radial direction
14 outer surface
15 hair-entry slit
16, 116, 216 hair-guiding strip portion
17 counter-cutting edge
18 inner surface
19 first side surface
20 normal vector at first side surface
21 second side surface
22 normal vector at second side surface
23 skin
31 radially inward cutting edge end
32 radially outward cutting edge end
33, 133, 233 upper segment of first side surface
36, 136, 236 upper segment of second side surface
34, 134, 234 intermediate segment of first side surface
37, 137, 237 intermediate segment of second side surface
35, 135, 235 intermediate segment of first side surface
38, 138, 238 intermediate segment of second side surface
y1-y4 axial distances to outer surface
FN Normal force
FF Frictional force
F Total resultant force
$\alpha$1 angle between axial direction and normal vector at first side surface
$\alpha$2 angle between axial direction and normal vector at second side surface
βl angle between axial direction and direction of exerted force at low pressure
βh angle between axial direction and direction of exerted force at high pressure
R1 radius of curvature of upper segment seen in cross-section
R102 radius of curvature of intermediate segment seen in cross-section
R202 radius of curvature of intermediate segment seen in cross-section
W distance between first and second surface=width of hair-entry slit In some instances the same reference signs have been used for mutually identical parts and portion of different examples shown.

The invention claimed is:

1. A hair-cutting unit for use in a shaving device, said hair-cutting unit comprising an external cutting member and an internal cutting member which is rotatable relative to the external cutting member in a rotational direction about an axis of rotation, wherein:
- the internal cutting member comprises a plurality of cutting elements, each having a cutting edge with a respective main directional component of extension in a radial direction relative to the axis of rotation and located on a side of said cutting element leading in said rotational direction;
- the external cutting member comprises an annular wall having an outer surface facing away from the internal cutting member and a plurality of hair-entry slits which are mutually separated by hair-guiding strip portions of the annular wall, each hair-entry slit and each hair-guiding strip portion being elongated and having a respective main directional component of longitudinal extension in the radial direction relative to the axis of rotation, and each hair-guiding strip portion having a counter-cutting edge for co-operation with the cutting edges of the internal cutting member during rotation of the internal cutting member in said rotational direction;

each hair-guiding strip portion has an inward surface facing the internal cutting member, an outward surface being part of said outer surface, a first side surface facing in the rotational direction, and a second side surface facing in a direction opposite to the rotational direction, wherein said inward surface and said second side surface mutually connect at the counter-cutting edge of the respective hair-guiding strip portion;

and wherein, as seen in a cross-section taken perpendicularly to the radial direction at least within a range of radial positions relative to the axis of rotation:

a maximum depth D of a respective hair-entry slit is defined as a length of a maximum axial extension of a hair-guiding strip portion adjacent to the respective hair-entry slit in an axial direction parallel to the axis of rotation;

a depth y is defined as a depth within the respective hair-entry slit as measured from said outer surface and along the axial direction, wherein $0 \leq y \leq D$;

a first normal vector at a respective first side surface and a second normal vector at a respective second side surface are each defined in a direction facing away from the corresponding hair-guiding strip portion;

said first normal vector having a non-zero component in said axial direction facing away from the internal cutting member, a first angle $\alpha\mathbf{1}$ between the first normal vector and said axial direction is defined in the acute angular range $0° < \alpha\mathbf{1} < 90°$, wherein $\alpha\mathbf{1}(y)$ is a value of the first angle $\alpha\mathbf{1}$ in a position on the first side surface at the depth y;

said second normal vector having a non-zero component in said axial direction facing away from the internal cutting member, a second angle $\alpha\mathbf{2}$ between the second normal vector and said axial direction is defined in the acute angular range $0° < \alpha\mathbf{2} < 90°$, wherein $\alpha\mathbf{2}(y)$ is a value of the second angle $\alpha\mathbf{2}$ in a position on the second side surface at the depth y;

said first side surface has an upper segment extending from the outer surface to a depth $y\mathbf{1}$ and a lower segment extending from a depth $y\mathbf{2}$ in a direction away from the upper segment, wherein $y\mathbf{2} \geq y\mathbf{1}$, $y\mathbf{1} \leq 0.2{*}D$ and $y\mathbf{2} \leq 0.6{*}D$;

said second side surface has an upper segment extending from the outer surface to a depth $y\mathbf{3}$, an intermediate segment extending from the depth $y\mathbf{3}$ to a depth $y\mathbf{4} > y\mathbf{3}$, and a lower segment extending from the depth $y\mathbf{4}$ in a direction away from the intermediate segment, wherein $y\mathbf{3} \leq 0.2{*}D$, $y\mathbf{4} \leq 0.6{*}D$ and $y\mathbf{4} - y\mathbf{3} \geq 0.2{*}D$;

an average angle of normal vectors of said intermediate segment of said second side surface $\alpha\mathbf{2}AV = 0.5{*}\{\alpha\mathbf{2}(y\mathbf{3}) + \alpha\mathbf{2}(y\mathbf{4})\}$; $\alpha\mathbf{2}(y\mathbf{3}) = \alpha\mathbf{2}AV +/- \alpha\mathbf{2}\delta$ and $\alpha\mathbf{2}(y\mathbf{4}) = \alpha\mathbf{2}AV +/- \alpha\mathbf{2}\delta$; $\alpha\mathbf{2}AV$ is in a range from 20° to 50°; $\alpha\mathbf{2}\delta$ is in a range from 0° to 10°;

in each position on the upper segment of said first side surface $\alpha\mathbf{1} \leq \alpha\mathbf{1}(y\mathbf{1})$ and $d\alpha\mathbf{1}(y)/dy \geq 0$;

in each position on the lower segment of said first side surface $70° \leq \alpha\mathbf{1} \leq 110°$;

in each position on the upper segment of said second side surface $\alpha\mathbf{2} \leq \alpha\mathbf{2}(y\mathbf{3})$ and $d\alpha(y)/dy \geq 0$; and in each position on the lower segment of said second side surface $70° \leq \alpha\mathbf{2} \leq 110°$.

2. A hair-cutting unit as claimed in claim 1, wherein:

said first side surface further has an intermediate segment extending from the depth $y\mathbf{1}$ to the depth $y\mathbf{2} > y\mathbf{1}$ and $y\mathbf{2} - y\mathbf{1} \geq 0.2{*}D$; and an average angle of normal vectors of said intermediate segment of said first side surface $\alpha\mathbf{1}AV = 0.5{*}\{\alpha\mathbf{1}(y\mathbf{1}) + \alpha\mathbf{1}(y\mathbf{2})\}$; $\alpha\mathbf{1}(y\mathbf{1}) = \alpha\mathbf{1}AV +/- \alpha\mathbf{1}\delta$ and $\alpha\mathbf{1}(y\mathbf{2}) = \alpha\mathbf{1}AV +/- \alpha\mathbf{1}b$; $\alpha\mathbf{1}AV$ is in a range from 20° to 50°; $\alpha\mathbf{1}\delta$ is in a range from 0° to 10°.

3. A hair-cutting unit as claimed in claim 2, wherein in any cross-section, taken perpendicularly to the radial direction, within said range of radial positions, $y\mathbf{1} = y\mathbf{3}$ and/or $y\mathbf{2} = y\mathbf{4}$.

4. A hair-cutting unit as claimed in claim 2, wherein in any cross-section, taken perpendicularly to the radial direction, within said range of radial positions, $\alpha\mathbf{1}AV = \alpha\mathbf{2}AV$.

5. A hair-cutting unit as claimed in claim 2, wherein in any cross-section, taken perpendicularly to the radial direction, within said range of radial positions, $\alpha\mathbf{1}\delta = \alpha\mathbf{2}\delta$.

6. A hair-cutting unit as claimed in claim 2, wherein in any cross-section, taken perpendicularly to the radial direction, within said range of radial positions $y\mathbf{2} - y\mathbf{1} \geq 0.3{*}D$.

7. A hair-cutting unit as claimed in claim 2, wherein $\alpha\mathbf{1}\delta = 0$ and $\alpha\mathbf{1} = \alpha\mathbf{1}AV$ in each position on the intermediate segment of said first side surface.

8. A hair-cutting unit as claimed in claim 1, wherein in any cross-section, taken perpendicularly to the radial direction, within said range of radial positions, $y\mathbf{4} - y\mathbf{3} \geq 0.3{*}D$.

9. A hair-cutting unit as claimed in claim 1, wherein in any cross-section, taken perpendicularly to the radial direction, within said range of radial positions, $\alpha\mathbf{2}\delta = 0$ and $\alpha\mathbf{2} = \alpha\mathbf{2}AV$ in each position on the intermediate segment of said second side surface.

10. A hair-cutting unit as claimed in claim 1, wherein $y\mathbf{2} \leq 0.5{*}D$ and/or $y\mathbf{4} \leq 0.5{*}D$.

11. A hair-cutting unit as claimed in claim 1, wherein in any cross-section, taken perpendicularly to the radial direction, within said range of radial positions:

in each position on the lower segment of said second side surface for which $y \leq 0.8{*}D$, $70° \leq \alpha\mathbf{2} \leq 110°$; and/or in each position on the lower segment of said first side surface for which $y \leq 0.8{*}D$, $70° \leq \alpha\mathbf{1} \leq 110°$.

12. A hair-cutting unit as claimed in claim 1, wherein in any cross-section, taken perpendicularly to the radical direction, within said range of radical positions, in each position on the lower segment of said second side surface for which $y \leq 0.9{*}D$, $70° \leq \alpha\mathbf{2} \leq 110°$.

13. A hair-cutting unit as claimed in claim 1, wherein, in any cross-section taken perpendicularly to the radial direction, said first side surface has a rounded shape connecting the lower segment of said first side surface to an adjacent portion of said inward surface.

14. A hair-cutting unit as claimed in claim 1, wherein, in any cross-section taken perpendicularly to the radial direction within said range of radial positions, a width W of each hair-entry slit has a value in the range $0.24\ mm \leq W \leq 0.36\ mm$, and said maximum depth D of each hair-entry slit has a value in the range $0.19{*}W \leq D \leq 0.42{*}W$.

15. A hair-cutting unit as claimed in claim 1, wherein rotary paths of the cutting edges of the internal cutting member along the inward surface of said annular wall extend from an inward cutting edge end to an outward cutting edge end, the inward cutting edge end being located closer to the axis of rotation than the outward cutting edge end, and wherein, for each of said hair-entry slits, said range of radial positions extends at least radially outwardly from a radially outermost one of inward cutting edge end and a radially inward radial end of said hair-entry slit to a radially innermost one of said outward cutting edge end and a radially outward radial end of said hair-entry slit.

16. A shaving unit for use in a shaving device, said shaving unit comprising a supporting member and at least two hair-cutting units according to claim 1.

17. A shaving device comprising a shaving unit according to claim 16 and a main body accommodating a motor and a drive system, wherein the shaving unit is coupled to the main body such that the internal cutting members of the hair-cutting units are rotatable by means of the motor via the drive system.

* * * * *